(12) United States Patent
Lyren et al.

(10) Patent No.: US 8,521,601 B1
(45) Date of Patent: *Aug. 27, 2013

(54) MARKETING AND SELLING FEATURE LENGTH MOVIES OVER NETWORKS

(76) Inventors: Philip Scott Lyren, Cleveland Heights, OH (US); Robert Louis Lyren, Wadsworth, OH (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/399,850

(22) Filed: Apr. 8, 2006

(51) Int. Cl.
*H04N 7/16* (2011.01)
(52) U.S. Cl.
USPC .............................. 705/26.1; 725/87; 725/62
(58) Field of Classification Search
USPC ...................... 705/10, 14, 26, 27; 725/62, 87
See application file for complete search history.

(56) References Cited

U.S. PATENT DOCUMENTS

| | | | | |
|---|---|---|---|---|
| 5,537,314 A * | 7/1996 | Kanter | ............................ | 705/14 |
| 5,576,755 A | 11/1996 | Davis et al. | | |
| 5,822,023 A | 10/1998 | Suman et al. | | |
| 6,029,141 A * | 2/2000 | Bezos et al. | ..................... | 705/27 |
| 6,049,778 A * | 4/2000 | Walker et al. | ................... | 705/14 |
| 6,701,355 B1 | 3/2004 | Brandt et al. | | |
| 6,704,027 B2 | 3/2004 | Nakano | | |
| 6,876,983 B1 | 4/2005 | Goddard | | |
| 6,920,428 B2 * | 7/2005 | Greene | ........................... | 705/16 |
| 6,980,962 B1 * | 12/2005 | Arganbright et al. | .......... | 705/26 |
| 7,174,312 B2 * | 2/2007 | Harper et al. | ................... | 705/35 |
| 7,176,987 B2 | 2/2007 | Liu | | |
| 7,200,423 B2 | 4/2007 | Bum | | |
| 7,616,750 B2 | 11/2009 | Cardiz et al. | | |
| 7,924,395 B2 | 4/2011 | Moore et al. | | |
| 2001/0034635 A1 * | 10/2001 | Winters | .......................... | 705/10 |
| 2002/0124252 A1 | 9/2002 | Schaefer | | |
| 2002/0180864 A1 | 12/2002 | Nakamura et al. | | |
| 2002/0188527 A1 | 12/2002 | Dillard et al. | | |
| 2003/0009385 A1 | 1/2003 | Tucciarone | | |
| 2003/0014320 A1 * | 1/2003 | Thompson et al. | ............. | 705/26 |
| 2003/0046152 A1 | 3/2003 | Colas et al. | | |
| 2003/0055717 A1 * | 3/2003 | Badugu et al. | .................. | 705/11 |
| 2003/0083961 A1 * | 5/2003 | Bezos et al. | .................... | 705/27 |
| 2003/0130906 A1 | 7/2003 | Maari | | |

(Continued)

FOREIGN PATENT DOCUMENTS

| | | |
|---|---|---|
| JP | 2005209011 | 8/2005 |
| WO | WO 2004047360 | 6/2004 |
| WO | WO 2004056104 | 7/2004 |

OTHER PUBLICATIONS http://web.archive.org/web/20040624124424/http://www.videounivers.com/ [published Jun. 24, 2004].*
http://web.archive.org/web/20050729082448/http://www.videouniverse.com/ [published Jul. 29, 2005].*
http://web.archive.org/web/20040821021354/http://videouniverse.com/ [published Aug. 21, 2004].*

(Continued)

*Primary Examiner* — John G Weiss
*Assistant Examiner* — Michael Stibley

(57) ABSTRACT

Embodiments include methods, apparatus, and systems for marketing and selling feature length movies over one or more networks. One method of marketing includes placing, at plural different internet locations, advertisements to purchase a feature length movie (FLM) before the FLM is publicly available to buy on digital video disk (DVD); soliciting, before the FLM is publicly available to buy on DVD, public individuals not previously affiliated with the FLM to become salespeople who sell the FLM over network spaces belonging to the public individuals; and compensating a salesperson for each sale of the FLM that occurs as a result of an advertisement at network spaces belonging to the salesperson.

8 Claims, 9 Drawing Sheets

(56) References Cited

U.S. PATENT DOCUMENTS

| | | | |
|---|---|---|---|
| 2003/0149628 A1 | 8/2003 | Abbosh et al. | |
| 2003/0191687 A1* | 10/2003 | Pavone | 705/14 |
| 2003/0204849 A1 | 10/2003 | Watanabe | |
| 2004/0002904 A1 | 1/2004 | Deas et al. | |
| 2004/0012613 A1 | 1/2004 | Rast | |
| 2004/0027496 A1 | 2/2004 | Morales | |
| 2004/0075589 A1 | 4/2004 | Wang et al. | |
| 2004/0214541 A1 | 10/2004 | Choi | |
| 2004/0259499 A1 | 12/2004 | Oba et al. | |
| 2005/0044025 A1 | 2/2005 | Tutty et al. | |
| 2005/0070327 A1 | 3/2005 | Watanabe | |
| 2005/0080884 A1 | 4/2005 | Siorpaes et al. | |
| 2005/0177386 A1 | 8/2005 | Essa | |
| 2005/0177857 A1 | 8/2005 | Park et al. | |
| 2005/0216940 A1 | 9/2005 | Black | |
| 2005/0227669 A1 | 10/2005 | Haparnas | |
| 2005/0250552 A1 | 11/2005 | Eagle et al. | |
| 2005/0278750 A1 | 12/2005 | Grossman et al. | |
| 2005/0289026 A1* | 12/2005 | Dunn et al. | 705/30 |
| 2006/0015649 A1 | 1/2006 | Zutaut et al. | |
| 2006/0015664 A1 | 1/2006 | Zhang | |
| 2006/0031886 A1 | 2/2006 | Bae et al. | |
| 2006/0088281 A1 | 4/2006 | Hasegawa | |
| 2006/0090207 A1 | 4/2006 | Tomita et al. | |
| 2006/0178901 A1 | 8/2006 | Cooper | |
| 2006/0203758 A1 | 9/2006 | Tee et al. | |
| 2006/0236258 A1 | 10/2006 | Othmer et al. | |
| 2006/0247976 A1* | 11/2006 | Posokhow et al. | 705/26 |
| 2006/0248113 A1* | 11/2006 | Leffert et al. | 707/103 R |
| 2006/0271973 A1 | 11/2006 | Jerding et al. | |
| 2007/0010261 A1 | 1/2007 | Dravida et al. | |
| 2007/0039025 A1 | 2/2007 | Kraft et al. | |
| 2007/0079014 A1 | 4/2007 | Volk et al. | |
| 2007/0086724 A1 | 4/2007 | Grady et al. | |
| 2007/0088616 A1 | 4/2007 | Lambert et al. | |
| 2007/0089124 A1* | 4/2007 | Bond | 725/8 |

OTHER PUBLICATIONS http://web.archive.org/web/20040526093548/http://videouniverse.com/ [published May 26, 2004].*

"Amazon.ca Celebrates the Holidays with the Gift of Free Shipping"; Canada NewsWire; Publication Date: Oct. 29, 2002; PR Newswire Association LLC; pp. 1-1 (1-6).* http://articles.latimes.com/1993-05-16/magazine/tm-35782_1_cable-television-industry/4.* http://web.archive.org/web/20060114075850/http://www.funformobile.com/forum/forum....*

U.S. Appl. No. 11/356,952, Philip S. Lyren, et al.

Olsen, Stephanie; "Star Wars clones appear on Net"; Jul. 25, 2002; http://news.cnet.com/Star-Wars-clones-appear-on-Net2100-1023 3-909507.html.

http://web.archive.org/web/20050129082448/http://www.videouniverse.com/ [published Jul. 29, 2005].

http://web.archive.org/web/20040821 021354/http://videouniverse.com/ [published Aug. 21, 2004].

Edward Jay Epstein; "Hollywood's Death Spiral" part 1 of 2 at www.slate.com/articles/arts/the_hollywood_economist/2005/07/hollywoods_death_spiral.html; Jul. 25, 2005.

Edward Jay Epstein; "Hollywood's Death Spiral" part 2 of 2 at www.slate.com/articles/arts/the_hollywood_economist/2005/08/hollywoods_death_spiral_part 2.html; Aug. 1, 2005.

Ronald Grover; Bloomberg Businessweek, "What's Driving the Box Office Batty" at www.businessweek.com/magazine/content/05_28/b3942101.htm; Jul. 11, 2005.

Kathy Clayton "Fox Broadcasting Looks at Launching Satellite Networks" in Cable World Magazine, v3, n47, p. 3, issued on Nov. 25, 1991.

Kurt Andersen "The Future is Looking Too Cool" in Time, Spectator Column, Jun. 14, 1993.

* cited by examiner

MARKETING AND SELLING FEATURE LENGTH MOVIES OVER NETWORKS

CROSS-REFERENCE TO RELATED APPLICATIONS

This application relates to U.S. application Ser. No. 11/343,634 filed Jan. 31, 2006; U.S. application Ser. No. 11/356,952 filed Feb. 18, 2006; U.S. application Ser. No. 11/368,764 filed Mar. 6, 2006; U.S. application Ser. No. 11/392,918 filed Mar. 29, 2006; U.S. application Ser. No. 11/396,524 filed Apr. 3, 2006; and U.S. application Ser. No. 11/434,615 filed May 16, 2006.

BACKGROUND

Most feature length movies have a relatively short period of time in which to make money. Traditionally, after a feature length movie is made, it is marketed and sold through different phases of its profitable life cycle. In an initial phase, feature length movies are first released only in movie theaters and open on the same day in various theaters throughout the country. During this time, the public can only view the movie in a theater. In a subsequent phase, the movie is released on digital video disk (DVD). Successful or popular movies are distributed in a final phase when the movie is released on television.

During each of these different phases, production companies must spend money to advertise and promote the movie. In order to lure moviegoers into movie theaters, production companies must spend money advertising to their target market. Often, the amount of money spent in advertisement is quite significant. It is not uncommon for production companies to spend millions of dollars marketing movies to moviegoers. For example, if a movie is nationally released, then the production company can elect to promote the movie throughout major cities across the United States. An extensive marketing campaign can cover large geographical areas and diverse marketing groups. Hence, the costs of advertisements can quickly escalate.

Advertisement costs increase for other reasons as well. In order to reach the core group of potential moviegoers, many different marketing medias are used. Suppose a production company intends to release the next summer blockbuster movie. The production company could advertise on television, radio, the internet, posters, billboards, etc. In some instances, actors or actresses starring in the movie travel around the United States or even around various parts of the world to promote the release of the movie. An enormous marketing budget can be consumed before the movie even opens to the public in theaters.

Thus, during the profitable lifecycle of a movie, production companies spend large amounts of money in marketing and selling the movie. Advertisement costs can accrue while the movie is being shown in theaters, while the movie is being distributed on DVD, and again while the movie is being shown on television, cable, or satellite.

In short, the traditional model for marketing, selling, and distributing a feature length movie can be quite complex and expensive.

SUMMARY

Embodiments include methods, apparatus, and systems for marketing and selling feature length movies over one or more networks. One method of marketing includes placing, at plural different internet locations, advertisements to purchase a feature length movie (FLM) before the FLM is publicly available to buy on digital video disk (DVD); soliciting, before the FLM is publicly available to buy on DVD, public individuals not previously affiliated with the FLM to become salespeople who sell the FLM over network spaces belonging to the public individuals; and compensating a salesperson for each sale of the FLM that occurs as a result of an advertisement at network spaces belonging to the salesperson.

Other embodiments and variations of these embodiments are shown and taught in the accompanying drawings and detailed description.

DETAILED DESCRIPTION

Figure 1:
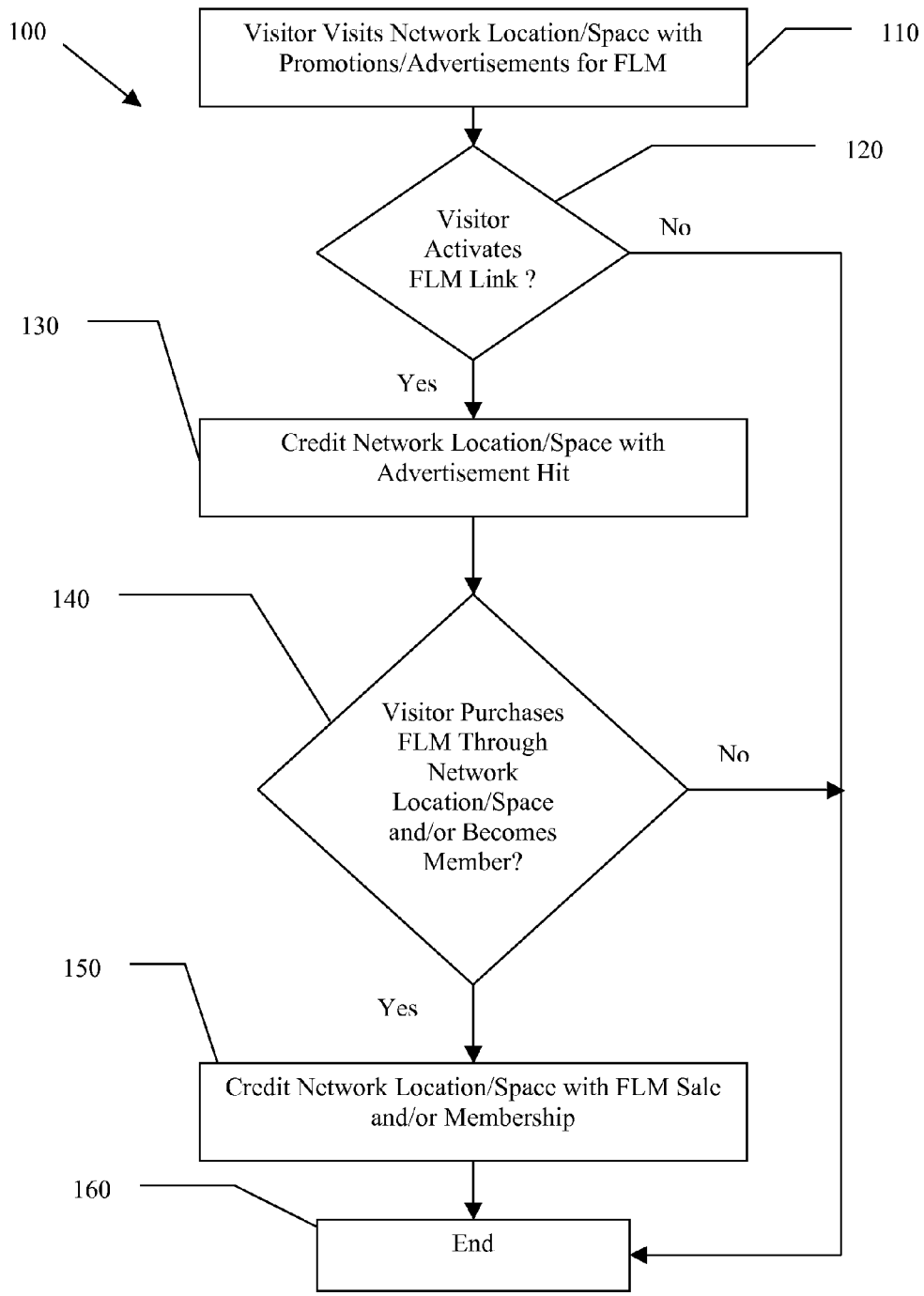
FIG. 1 is a flow diagram for crediting members or network locations/spaces for advertisement hits or sales of feature length movies in accordance with an exemplary embodiment of the present invention.

Embodiments in accordance with the present invention are directed to apparatus, systems, and methods for marketing and selling feature length movies (FLMs) over one or more networks. In one exemplary embodiment, individuals advertise feature length movies over one or more networks. For instance, an individual places an advertisement or promotion for a feature length movie at his or her website or network location/space. When visitors navigate to the website or network location/space, they see or hear an advertisement for the feature length movie. The advertisement includes a hyperlink to purchase the movie or obtain more information about the movie. Each time a visitor clicks or activates an advertisement for the feature length movie, the individual hosting or displaying the advertisement is compensated. Likewise, each time a visitor purchases the feature length movie from a website or network location/space, the individual hosting or displaying the advertisement is compensated.

Embodiments in accordance with the present invention enable individuals to sell feature length movies for third parties, example for movie production companies or movie distribution companies. Individuals can sign-up, enlist, or agree to sell movies before or after the feature length movie is released in theaters or DVDs. Such individuals do not need prior sales or marketing experience. Further, they are not required to be incorporated or prior employees of the movie production company or movie distribution company. Instead, in one exemplary embodiment, the right to advertise and sell feature length movies over the internet is extended to the general public or all individuals with access to the internet.

Individuals are compensated or paid based on actual advertisement hits or actual sales of movies. The more movies an individual sells, the more income the individual receives. Thus, financial gain provides individuals with an incentive to sell the movie.

Many individuals are members of network spaces having thousands or even millions of members. Each individual member in the network space has access to network spaces of other members. In some instances, members form groups within the network space. For example, a single member can have hundreds or thousands of "friends" or members that belong to the single member's group. Further, a single member can have large amounts of daily network traffic to his or her network location/space. With embodiments in accordance with the present invention, this single member can financially capitalize on his or her popularity. When visitors visit the single member's network location/space, the visitors are exposed to information or advertisements about the feature length movie. If a visitor responds to the advertisement or purchases the movie, then the single member is financially compensated.

With embodiments in accordance with the present invention, marketing and selling of feature length movies can rapidly spread across entire networks and reach thousands or even millions of people. This marketing and sales expansion occurs, in part, because individuals are provided financial incentive to join a sales force and advertise and sell movies. Assume for example that a visitor visits a network space of a friend and learns about a cool new feature length movie. The visitor watches a trailer for the movie and decides to buy it. The friend is compensated for the purchase. After purchasing the movie, however, the visitor is also given an opportunity to market and sell the movie. The visitor can instantly become a salesperson for the movie. Thus, as more and more people buy the movie, more and more people become salespeople for the movie. If the movie is popular or cool, then marketing and sales forces rapidly grow or expand across the interne or network space as new members become salespeople.

As noted, after an individual buys the feature length movie, he or she is given an opportunity to become a marketing and salesperson for the movie. After agreeing to terms of being a salesperson, the individual is provided with marketing and sales tools to advertise and sell the feature length movie. In one exemplary embodiment, the individual is provided with information and movie trailers about the film. The information and movie trailers are displayed at the website or network location/space of the individual. For instance, after agreeing to sell a feature length movie, one or more different marketing campaigns are presented to the salesperson. The salesperson chooses which marketing campaign best suits his or her style, mood, potential customer base, etc. In one exemplary embodiment, different movie trailers are presented to the salesperson. The salesperson selects one or more of these movie trailers to exhibit at his or her own website or network location/space.

In one exemplary embodiment, salespeople for the feature length movie build a customized or personalized advertisement or marketing plan for the feature length movie. Thus, a salesperson can tailor or build advertisements for the feature length movie. For instance, the salesperson is presented with various video clips from the feature length movie. The salesperson arranges the video clips in a particular sequence to build a unique movie trailer for the film. The salesperson can also be presented with various soundtracks, dialogue, or songs that are included in the movie. These soundtracks can be added to the movie trailer or added to the website or network location/space as part of the advertisement for the movie. Each individual or salesperson can thus build his or her own, unique advertisement for the feature length movie.

As noted in the background section, traditional models for marketing and selling feature length movies are expensive, especially if movies are nationally or globally marketed. Thousands or even millions of dollars can be spent marketing and promoting a new movie with the traditional model. Unlike the traditional model, embodiments in accordance with the present invention enable moviegoers themselves to market and sell the movie. If a person watches or buys the movie, he or she is given an opportunity to sell the movie. Marketing and sales occur over networks, such as the internet. If a movie is popular, then information and advertisement about the movie can rapidly spread through and across networks and quickly reach thousands or millions of potential purchasers.

With embodiments in accordance with the present invention, marketing and advertisement costs are significantly reduced since purchasers of the movie form part of the sales force. In some embodiments, marketing costs are eliminated or reduced to thousands of dollars (as opposed to many millions of dollars with the traditional marketing model). Before the release date of the feature length film, advertisements and movie trailers are distributed to heavily trafficked network locations/spaces. In other words, advertisements and movie trailers are seeded or planted in one or more network environments. For instance, network spaces of celebrities, movie stars, or popular people are provided with advertisements for the upcoming feature length film. These people endorse the movie since an advertisement appears on their website or network location/space. After seeing the advertisement, visitors decide to purchase the movie and become members of the sales team. These new members of the sales team then display advertisements and promotions for the movie at their network locations. These new members also notify friends or network groups using emails, blogs, electronic announcements, electronic bulletin boards, instant messaging, pop-ups, etc. As more people purchase the movie, more people join the marketing and sales team. Marketing and sales are thus provided at little or no cost since individuals are marketing the movie for no salary or up-front fee. In other words, purchasers of the movie market the movie for free to their network friends, groups, etc. In one embodiment, individuals are only paid once they cause a sale to occur.

FIG. 1 is a flow diagram 100 for crediting members or network locations/spaces for advertisement hits or sales of feature length movies in accordance with an exemplary embodiment of the present invention. According to block 110, visitors visit network locations/spaces with promotions or advertisements for one or more feature length movies. Websites, web pages, and/or network locations/spaces display information, hyperlinks, advertisements, and/or promotions offering for sale one or more feature length movies. The advertisements are directed to encourage visitors to learn more information about the feature length movie or purchase the movie. For example, the advertisements can include one or more movie trailers, deleted scenes, interviews with the director or crew or cast, commentary about the film, audio clips, soundtracks, hyperlinks, promotions, etc.

According to block 120, a question is asked whether the visitor requests more information about the feature length movie in response to the advertisement. For example, the visitor can click, activate, or inquire about an advertisement, hyperlink, window, banner, pop-up, etc. If the answer to this question is "no," then flow ends at block 160. If the answer to this question is "yes," then flow proceeds to block 130.

According to block 130, individuals or network locations/spaces are paid or compensated for successful advertisement. For example, money or compensation is provided for each "hit" or "click" or "pay-per-click," wherein the individual or network location/space is paid for each click or click-through on an advertisement. As another example, the individual or network location/space is paid on other advertisement basis, such as, but not limited to, pay-per-lead (payment for the generation of sales leads), pay-per-view (payment for enticing a visitor to view something), etc.

According to block 140, a question is asked whether the visitor purchases the feature length movie through the website or network location/space and/or becomes a member of the sales team. If the answer to this question is "no," then flow ends at block 160. If the answer to this question is "yes," then flow proceeds to block 150.

Upon purchasing a feature length movie, buyers can select to receive hardcopy or non-hardcopy versions of the movie. Hardcopy versions of feature length movies include digital video disks (DVDs) and video cassette recorders (VCRs). Non-hardcopy versions include, but are not limited to, receiving or watching FLMs through one or more of downloads, hyperlinks, emails, broadcasts, text message, network transmissions, portable memory cards, website access, etc. For instance, access to the feature length movie is transmitted to a designated location (example, email address, cellular phone number of a handheld portable electronic device (HPED) or handheld portable cellular device (HPCD), text message, etc.), provided in any one or various electronic formats or media, or provided at a network location. For example, access is provided at a website or provided an HPED or computer as a hyperlink, text message, or email, to name a few examples. Further, the password, account number, authorization code, etc. can be electronically provided to a user or HPED to access, download, and/or watch a FLM. For instance, when the user "clicks" a hyperlink on the HPED, the selected feature length movie begins to play on the display of the HPED. In another exemplary option, the feature length movie is made available for viewing on home television. For instance, the feature length movie is sent to the user's residence, residential television, or network location. When the user returns home, the user can access the selected movie through the television, home computer, notebook computer, email, etc. In another exemplary option, a user receives the selected feature length movie on a portable memory stick or card. The memory card, for example, is inserted into the HPED or other electronic device (example, desktop or notebook computer) so the movie can be played on the electronic device.

According to block 150, individuals or network locations/spaces are paid or compensated for successful selling a feature length movie to another individual, such as a visitor to the individual's website or network location/space. For example, money or compensation is provided when the advertisement causes a sale of a feature length movie. For example, the sale can occur when the visitor buys a DVD, a tape, a movie ticket, a download to the movie, a broadcast to the movie, a transmission to view the movie, a hyperlink to view or download the movie, a portable memory card containing the movie, etc.

Any one of various methods can be used to track a network location where an advertisement hit or sale occurs and from where the cause of the hit or sale originated. For example, in order to credit an individual or network location/space according to blocks 130 and 150, the origination of the advertisement causing the hit or sale is electronically tracked.

In one exemplary embodiment, purchasers of the feature length movie can also become eligible to advertise and sell the feature length movie. Individuals and/or network locations/spaces can be provided additional compensation if a visitor also becomes a member in addition to purchasing the feature length movie. By way of illustration, suppose a particular FLM sells for $15.00. Member A advertises the FLM at his or her network space. Visitor B navigates to member A's network space, views the advertisement, and purchases the FLM. In return, member A receives $1.00, or the network location/space is credited with one sale. However, if visitor B also becomes a member of the sales force to market and sell the FLM, then member A receives an additional compensation of $0.50. Thus, for both the sale and membership, member A receives a total of $1.50.

Figure 2:
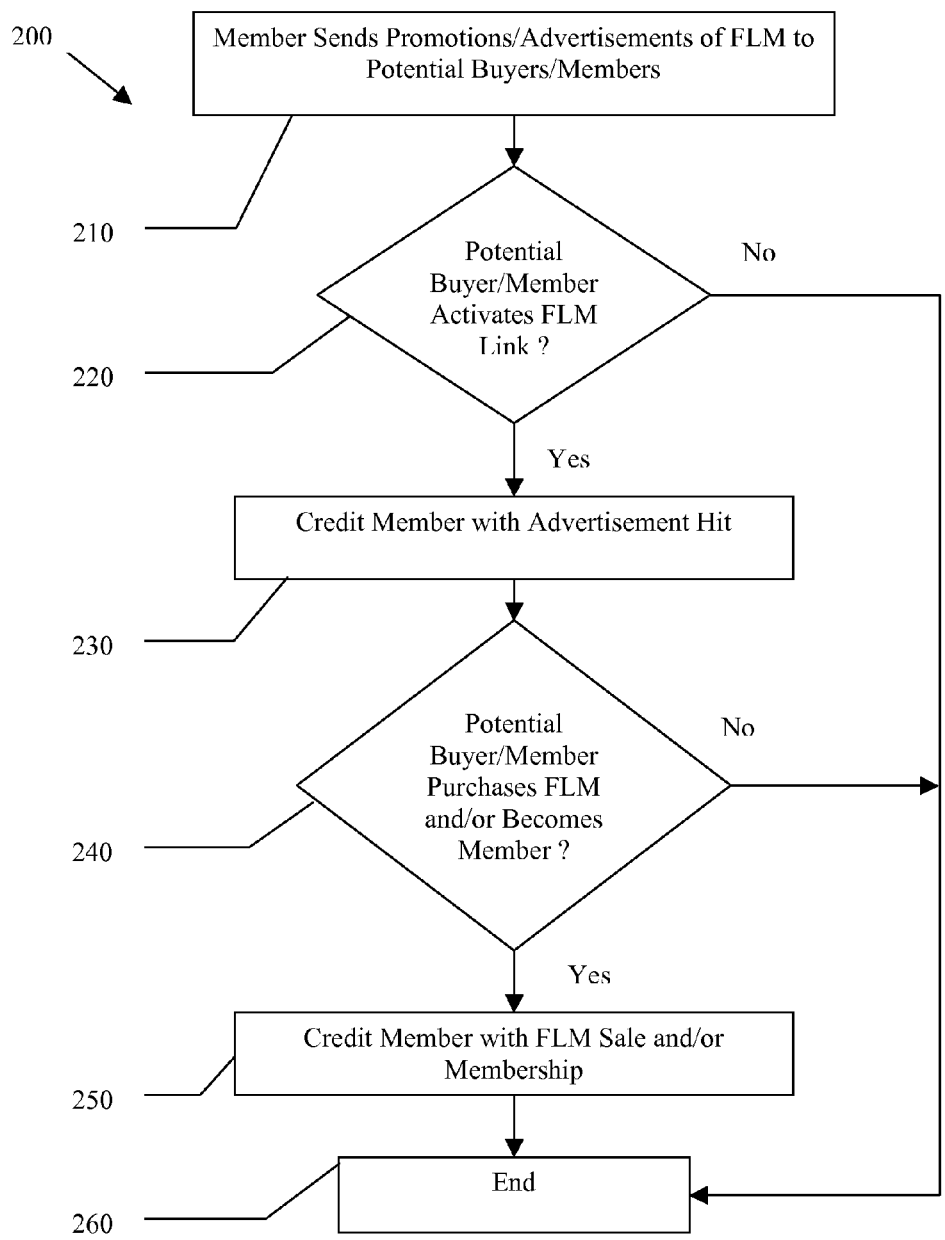
FIG. 2 is another flow diagram for crediting members or network locations/spaces for advertisement hits or sales of feature length movies in accordance with an exemplary embodiment of the present invention.

FIG. 2 is another flow diagram 200 for crediting members or network locations/spaces for advertisement hits or sales of feature length movies in accordance with an exemplary embodiment of the present invention. According to block 210, an individual sends a promotion or advertisement for a feature length movie to one or more potential buyers. In one exemplary embodiment, the individual previously purchased the feature length movie and became a member of a sales force or team that advertises and sells the feature length movie.

Individuals can advertise or promote the feature length to potential buyers over one or more networks in a variety of ways. For example, the individual can send emails or electronic messages to friends, family, employees, organizations, corporations, websites, network locations/spaces, people in his or her network space or group, etc. As another example, the individual can draft or write a post, an announcement, or blog. For example, a blog can mention or advertise the feature length movie at the individual's website or network location/space. Alternatively, announcements or messages can be electronically sent to members of the individual's network space.

Individuals can use various forms of advertisements, promotions, information, etc. to both solicit sales of FLMs and solicit members of the general public to advertise and sell FLMs (example, become a permanent or temporary salesperson or member of a sales team, sales staff, etc. involved in advertising and selling FLMs). In one exemplary embodiment, any member of the public can join and become a member to advertise and sell FLMs. The right to advertise and sell FLMs can extend only for a single or specific FLM. Alternatively, the right to advertise and sell FLMs can extend to multiple FLMs or for a specified period of time. For example, a member of the general public can receive the right to sell plural different FLMs being released from one or more particular movie production companies or movie distribution companies. In one exemplary embodiment, such members of the general public are not previously affiliated with the FLM being sold (example, the individual is not a current employee of the movie production or distribution companies, not an actor of the FLM, not a crew member of the FLM, etc.). Such members of the general public are not even required to have previous sales experience, including previous sales experience with any product or service.

According to block 220, a question is asked whether the potential buyer requests more information about the feature length movie in response to the advertisement of block 210. For example, the potential buyer can click, activate, or inquire about an advertisement, hyperlink, window, banner, pop-up, etc. If the answer to this question is "no," then flow ends at block 260. If the answer to this question is "yes," then flow proceeds to block 230.

According to block 230, individuals or network locations/spaces are paid or compensated for successful advertisement. For example, money or compensation is provided for each "hit" or "click" or "pay-per-click," wherein the individual or network location/space is paid for each click or click-through on an advertisement. As another example, the individual or network location/space is paid on another basis, such as, but not limited to, pay-per-lead (payment for the generation of sales leads), pay-per-view (payment for enticing a visitor to view something), etc.

According to block 240, a question is asked whether the potential buyer purchases the feature length movie and/or becomes a member in response to the advertisement. If the answer to this question is "no," then flow ends at block 260. If the answer to this question is "yes," then flow proceeds to block 250.

According to block 250, individuals or network locations/spaces are paid or compensated for successful selling a feature length movie to another individual, such as a potential buyer that received an advertisement from the individual. For example, money or compensation is provided when the advertisement causes a sale of a feature length movie. For example, the sale can occur when the potential buyer buys a DVD, a tape, a movie ticket, a download to the movie, a broadcast to the movie, a transmission to view the movie, a hyperlink to view or download the movie, a portable memory card containing the movie, etc.

As noted, individuals can be provided additional compensation if a potential purchaser also becomes a member in addition to purchasing the feature length movie. By way of illustration, suppose a particular FLM sells for $15.00. Member A sends potential buyer B information about or advertisement for a FLM. In response to this information or advertisement, potential buyer B buys the FLM. In return, member A receives $1.00. However, if buyer B also becomes a member of the sales force to market and sell the FLM, then member A receives an additional compensation of $0.50. Thus, for both the sale and membership, member A receives a total of $1.50.

Each time a visitor or potential buyer buys a feature length movie, the individual or network location/space is compensated for a sale. Thus, compensation increases as the number of movie sales increases. Embodiments in accordance with the present invention provide individuals and/or network locations/spaces with financial incentive to advertise and sell feature length movies over networks.

Figure 3:
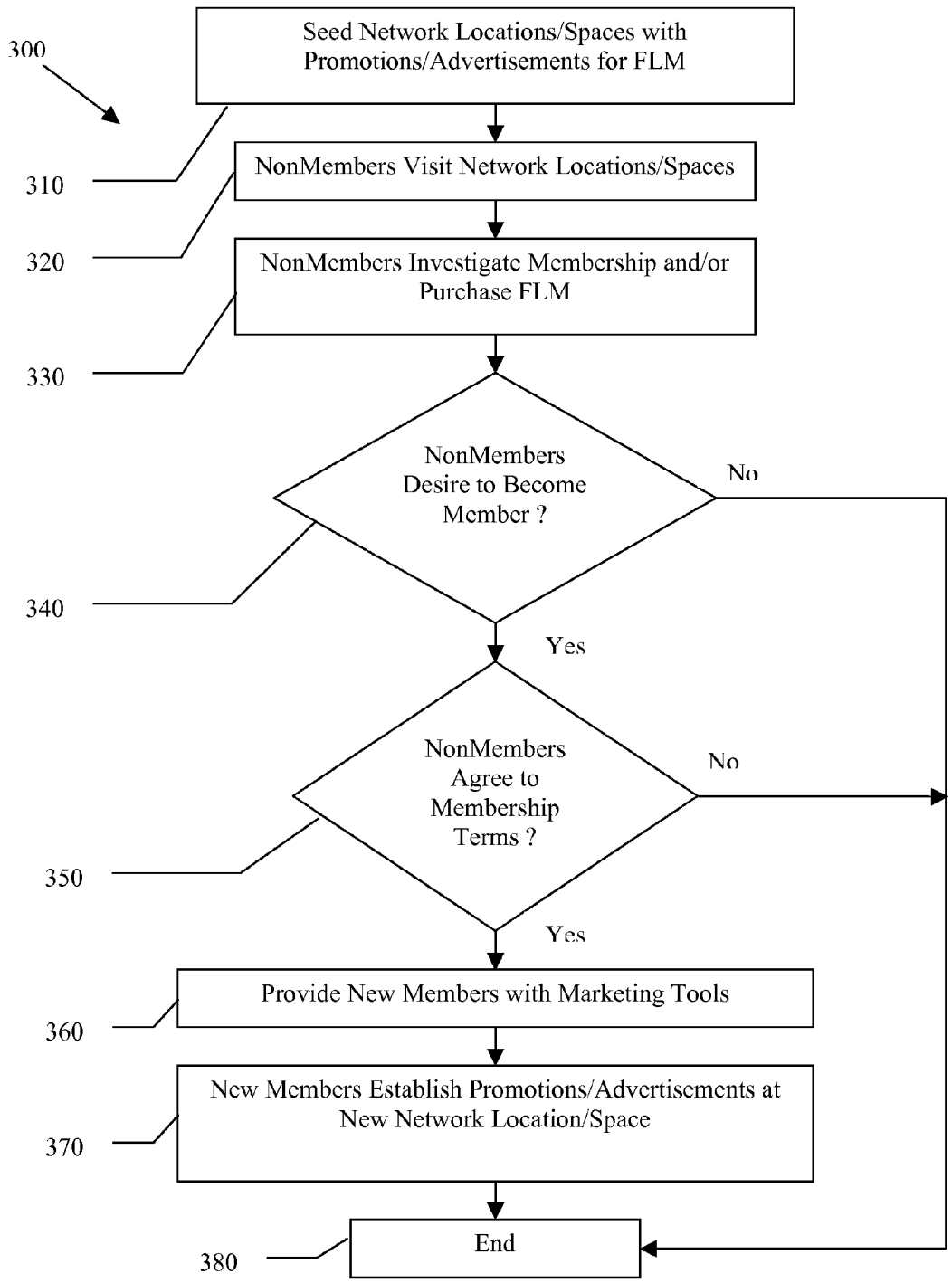
FIG. 3 is a flow diagram for expanding sales and marketing bases of feature length movies over one or more networks in accordance with an exemplary embodiment of the present invention.

FIG. 3 is a flow diagram 300 for expanding sales and marketing bases of feature length movies over one or more networks in accordance with an exemplary embodiment of the present invention. According to block 310, one or more network locations/spaces are seeded with promotions and/or advertisements for a feature length movie. The promotions and/or advertisements are strategically placed to increase the likelihood that information about the movie will spread across the network. As information spreads across the network, sales of the movie will increase. Additionally, as sales increase, individuals opting to sell the movie will also increase.

The initial locations for the first advertisements can be placed at popular or heavily trafficked network locations/spaces. Further, celebrities, movie stars, famous people, actors in the FLM, directors, producers, screenwriters, or popular people can endorse the movie at the network site and/or host or display advertisements to buy the feature length movie. As another example, the initial or first advertisements can be placed at network locations that are popular with the specific market to which the movie is being marketed. For example, if the movie is primarily being marketed to teenagers or people in the twenties, the network locations/spaces with the initial advertisements are popular with or used by people of this same age group.

According to block 320, potential purchasers of the feature length movie then visit the network locations/spaces. These purchasers are nonmembers (i.e., not currently authorized to advertise or sell the feature length movie).

According to block 330, visitors or nonmembers investigate membership, receive information about the feature length movie, and/or purchase the movie. Upon navigating to a seeded network location, visitors watch a movie trailer, listen to soundtracks, receive promotions, hear sound clips from the movie, receive commentary or testimonials, receive movie reviews, etc. Visitors can also investigate or receive information about becoming a member and thus receive the right to advertise and sell the feature length movie for compensation.

According to block 340, a question is asked whether the nonmember desires to become a member. Membership may or may not have restrictions. For instance, in one exemplary embodiment, only individuals who actually purchase the feature length movie are extended an invitation to become members. In another exemplary embodiment, individuals are not required to purchase the movie in order to become a member. Nonmembers can be required to pay a fee for membership or agree to certain terms or conditions in order to receive and maintain membership and the right to advertise and sell feature length movies on behalf of a production company or distribution company.

If the answer to the question in block 340 is "no," then flow ends at block 380. If the answer to the question is "yes," then flow proceeds to block 350. Here, a question is asked as to whether the nonmember agrees to membership terms. Membership terms can be nominal to extensive. For example, owners to the rights of the movie, production companies, movie distributors, lawyers, etc. can set various terms for allowing individuals the right to advertise and sell feature length movies. One skilled in the art appreciates the breadth of possibilities for such terms.

If the answer to the question in block 350 is "no," the flow ends at block 380. If the answer to the question is "yes," then flow proceeds to block 360. Once a member agrees to the terms and/or conditions for membership (assuming such terms or conditions are required), then the new member is immediately provided (example in real-time) with marketing tools to advertise and sell the selected feature length movies. For instance, new members are provided with information about the movies, movie trailers, sound clips, commentary, movie reviews, price information, show times, etc. Generally, the new members are provided with any information deemed appropriate to successfully market and sell the feature length movie.

According to block 370, new members establish promotions and advertisements at their network locations/spaces. In other words, the new members are provided with the marketing tools discussed in connection with block 360. For instance, new members are provided with a hyperlink to an official website for the feature length movie. New members are also provided with pricing information or information on availability of formats for receiving the feature length movie. For instance, purchasers of a feature length film may desire to receive the feature length movie in one or more of a variety of media formats or ways, such as, but not limited to, DVD, tape, movie ticket, download to the movie, a broadcast to the movie, a transmission to view the movie, a hyperlink to view or download the movie, a portable memory card containing the movie, etc. As another example, new members are provided with movie trailers or hyperlinks to movie trailers. When a visitor visits the new member's network location/space, the visitor can watch a movie trailer. New members are also provided with sound tracks to music or songs featured in the movie.

Figure 4:
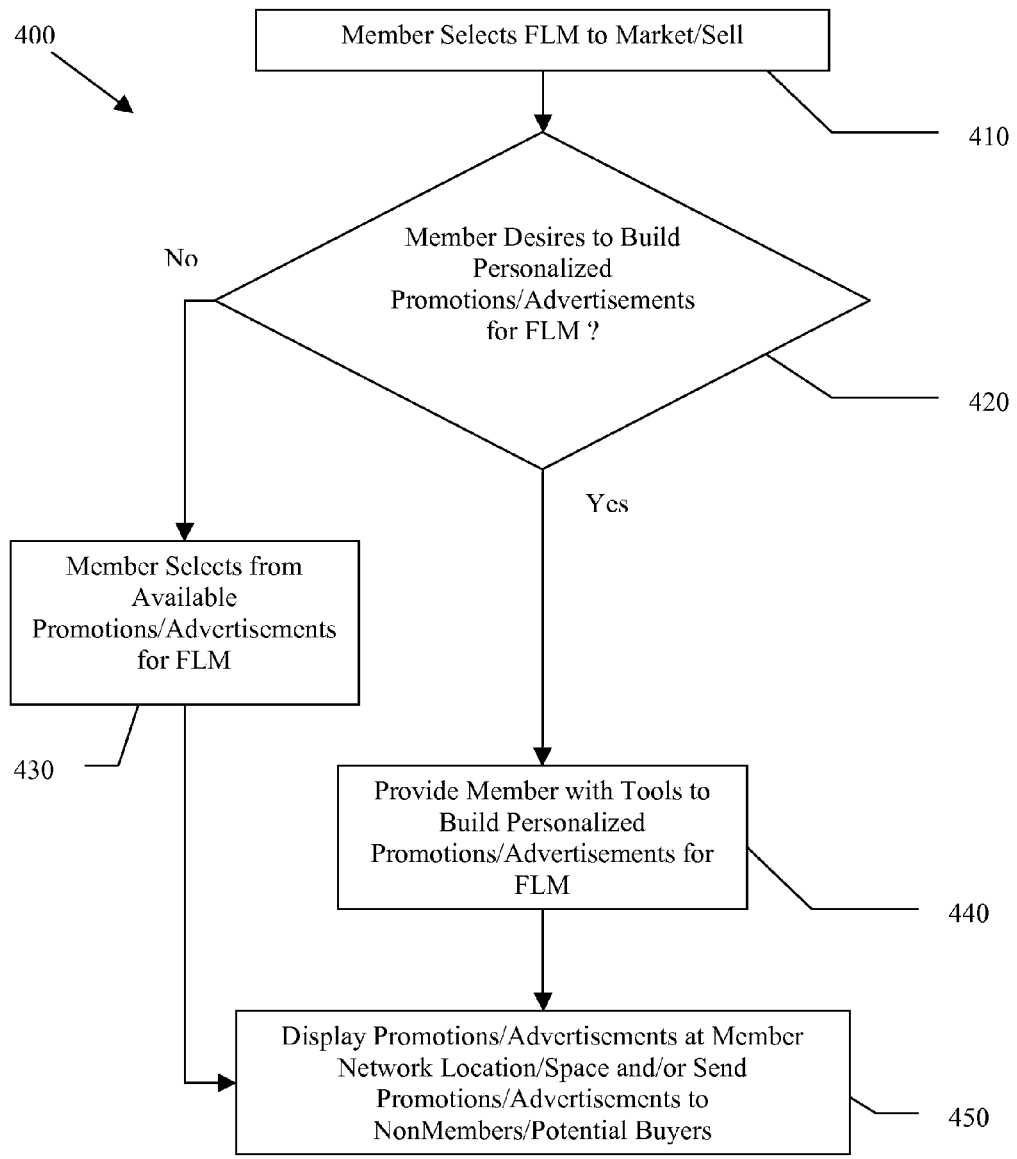
FIG. 4 is a flow diagram for providing members with tools to market and sell feature length movies over one or more networks in accordance with an exemplary embodiment of the present invention.

FIG. 4 is a flow diagram 400 for providing members with tools to market and sell feature length movies over one or more networks in accordance with an exemplary embodiment of the present invention. According to block 410, a member selects from one or more feature length movies to market and sell. For example, the member can select from plural different feature length movies that are not yet released (example, movies still in production or movies scheduled to be released in the future). The member can also select from plural different feature length movies that are already released, such as movies currently for sale in the theater and/or DVD. Thus, members can select from one or more feature length movies before, after, or during their release.

According to block 420, a question is asked whether the member desires to build personalized or customized promotions or advertisements for the selected feature length movies. If the answer to this question is "no," then flow proceeds to block 430. If the answer to this question is "yes," then flow proceeds to block 440.

According to block 430, members select from one or more available or preconfigured promotions and/or advertisements for the selected feature length movies. Such promotions and/or advertisements are ready for immediate download or transfer to the member's network location/space. In this instance, the marketing campaigns are already assembled so the user can readily and easily transfer them to his or her network location/space. For example, upon selecting one or more advertisement packages, the packages are automatically sent, downloaded, or made available to the member and/or his or her network location/space.

By selecting the option according to block 430, members can choose between various different advertisement packages. For instance, an advertisement package can be selected to best fit the style of the member or the member's prospective purchasers. By way of example, advertisement packages can vary in color, size, promotions, style, design, format, sounds, video clips, sound clips, complexity, etc. In one exemplary embodiment, the advertisement packages are assembled and complete and ready for immediate use to advertise and sell the feature length movie. Further, the advertisement packages are designed for the marketed audience of the feature length movie. For instance, a feature length movie rated G would have different advertisement packages than a feature length movie rate R.

If a member chooses flow to block 440, then he or she desires to customize or personalize an advertisement package. In other words, the member desires to become more involved in the construction or assembly of an advertisement package that will be displayed at the member's network location/space. Instead of choosing previously assembled advertisements, the member is able to build an advertisement package that is more custom or personal. For instance, the member is involved in selecting or changing one or more of color, size, promotions, style, design, format, sounds, video clips, sound clips, complexity, etc.

According to block 450, the selected or constructed advertisement packages are ready for download or transfer to the member's network location/space. Members are now able to display promotions and/or advertisements at their network locations/spaces. Members can also send, transmit, and/or disseminate information, promotions, advertisements, etc. to nonmembers or potential purchasers of the selected feature length movies.

Figure 5:
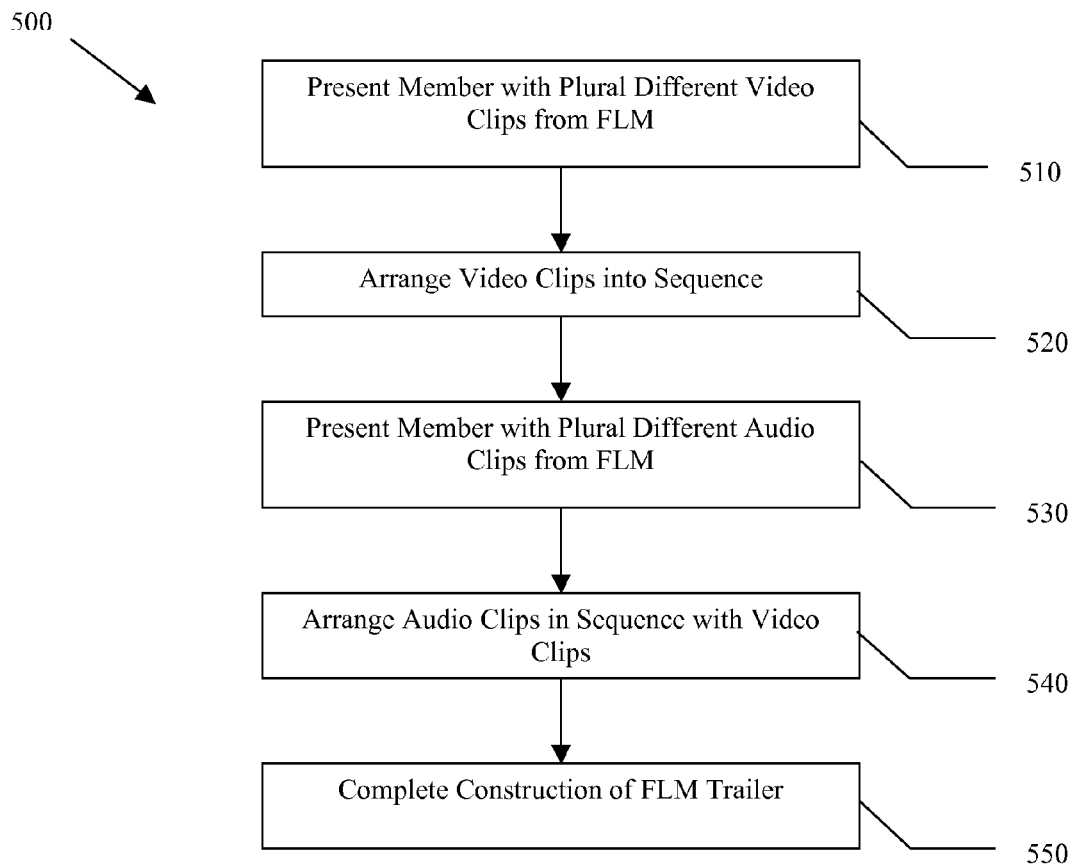
FIG. 5 is a flow diagram for building custom movie trailers for feature length movies in accordance with an exemplary embodiment of the present invention.

FIG. 5 is a flow diagram 500 for building custom movie trailers for feature length movies in accordance with an exemplary embodiment of the present invention. According to block 510, members are presented with plural different video clips from the feature length movie. According to block 520, members are able to select, arrange, and sequence different movie or video clips in order to construct a video arrangement for a movie trailer.

Figure 6A:
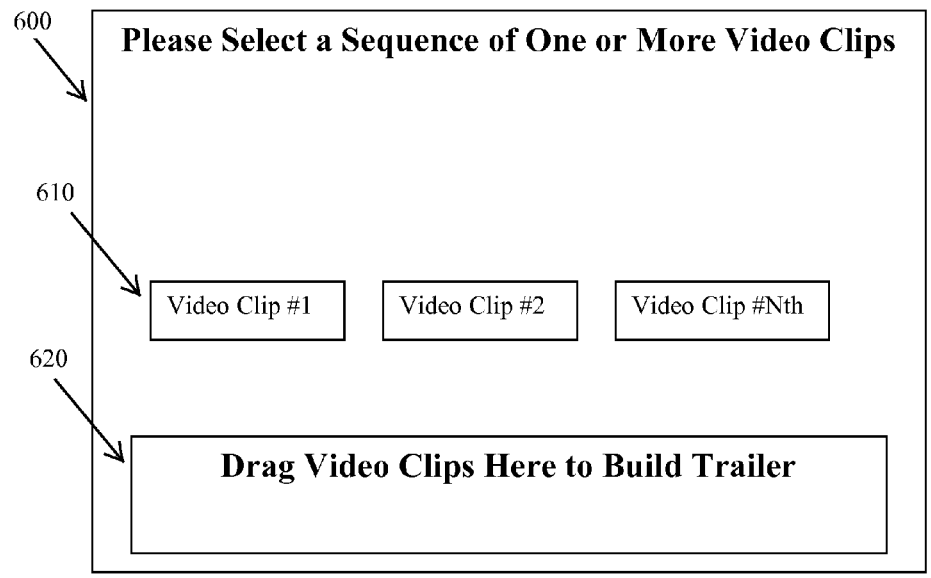
FIG. 6A is an exemplary screen shot of a display for arranging video clips to build a movie trailer in accordance with an exemplary embodiment of the present invention.

FIG. 6A is an exemplary screen shot of a display 600 for arranging video clips 610 to build a movie trailer in accordance with an exemplary embodiment of the present invention. By way of example, the member is instructed to select a sequence of one or more video clips from a plurality of different video clips 610. The video clips are footage from the selected feature length movie, deleted scenes, advertisements, commentary, interviews with the actors or crew, etc. The member drags and drops one or more selected video clips into an area 620 in order to construct a particular sequence of video. The finished movie trailer will play the selected video clips in the sequence in which they are selected to area 620. As such, the member is able to construct his or her own movie trailer for the feature length movie.

According to block 530, members are presented with plural different audio clips from the feature length movie. According to block 540, members are able to select, arrange, and sequence different audio clips in order to construct an audio arrangement for the sequence of videos selected for the movie trailer.

Figure 6B:
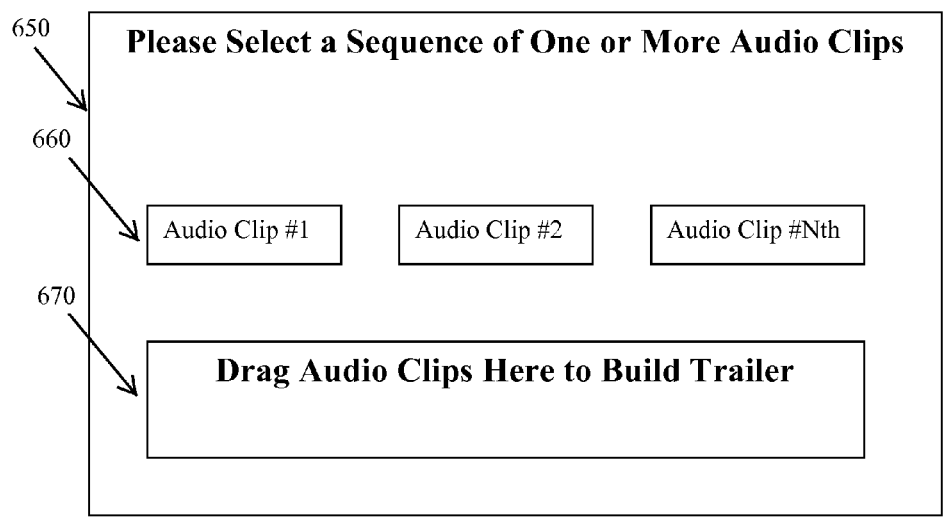
FIG. 6B is an exemplary screen shot of a display for arranging audio clips to build a movie trailer in accordance with an exemplary embodiment of the present invention.

FIG. 6B is an exemplary screen shot of a display 650 for arranging audio clips 660 to build a movie trailer in accordance with an exemplary embodiment of the present invention. By way of example, the member is instructed to select a sequence of one or more audio clips from a plurality of different audio clips 660. The audio clips are sound from the selected feature length movie, songs or soundtracks to the movie, deleted scenes, advertisements, commentary, interviews with the actors or crew, etc. The member drags and drops one or more selected audio clips into an area 670 in order to construct a particular sequence of audio that corresponds with the selected video arrangement.

According to block 550, the completed movie trailer will play the selected video and audio clips in the sequence in which they are selected. As such, the member is able to construct his or her own, original, unique movie trailer for the feature length movie.

Figure 7:
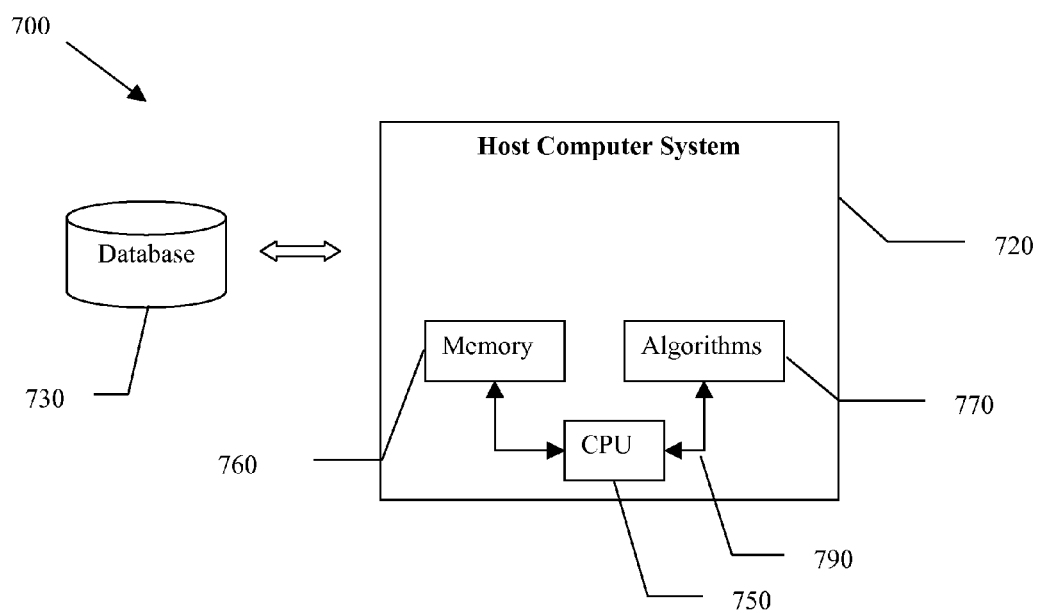
FIG. 7 is a block diagram of an exemplary system in accordance with the present invention.

Embodiments in accordance with the present invention can be utilized in a variety of systems, methods, and apparatus. FIG. 7 illustrates an exemplary embodiment as a system 700 for utilizing one or more of the flow diagrams and/or aspects of exemplary embodiments in accordance with the present invention.

The system 700 includes a host computer system 720 and a repository, warehouse, or database 730. The host computer system 720 comprises a processing unit 750 (such as one or more processors of central processing units, CPUs) for controlling the overall operation of memory 760 (such as random access memory (RAM) for temporary data storage and read only memory (ROM) for permanent data storage) and algorithms 770 (which may be located in memory 760 or other location). The memory 760, for example, stores data, control programs, and other data associate with the host computer system 720. The processing unit 750 communicates with memory 760, data base 730, algorithms 770, and many other components via buses 790.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

Embodiments in accordance with the present invention can utilize a wide variety of computing devices, including handheld portable electronic devices (HPEDs) having cellular telephone capabilities. Embodiments in accordance with the present invention, though, are not limited to cellular or mobile telephones or any particular type of portable computing device. By way of example, embodiments in accordance with the present invention include, but are not limited to, handheld computing devices, cellular or mobile phones, digital cameras, portable computers (such as notebook computers), handheld audio playing devices (example, handheld devices for downloading and playing music and videos), personal digital assistants (PDAs), combinations of these devices, and other portable electronic devices and systems.

Users of HPEDs can select and watch feature length movies. For instance, selected movies are downloaded to an HPED or otherwise emailed, transmitted, broadcast, or sent to a user or HPED. Preferably, the handheld portable cellular device (HPCD) or HPED has at least one display for viewing and entering information, navigating a network, and playing feature length movies (FLMs). For instance, users can use the HPED implement one or more aspects, embodiments, and/or algorithms of the present invention. Upon purchasing a feature length movie, a user is given present or future access or access rights to one or more feature length movies through download, email, hyperlink, text message, broadcast, etc.

Figure 8:
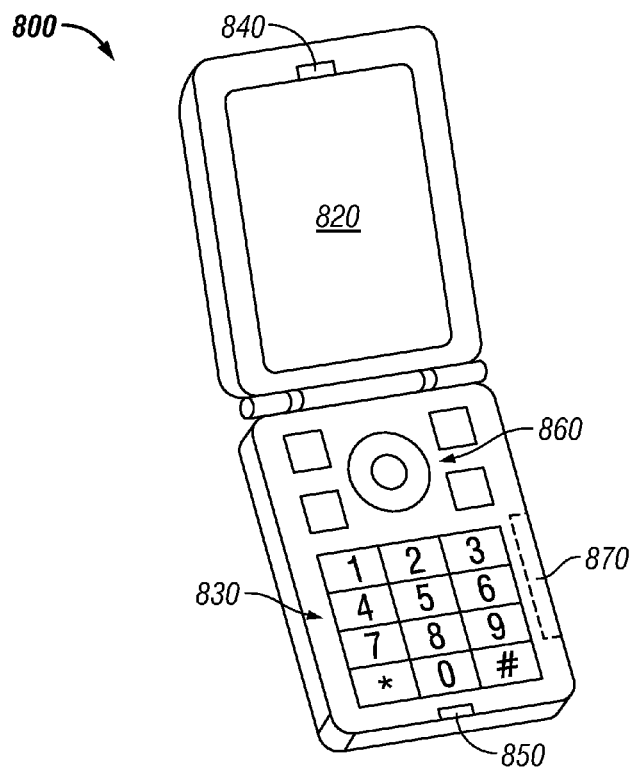
FIG. 8 is a perspective view of an exemplary handheld portable electronic device for utilizing one or more exemplary embodiments in accordance with the present invention.
Figure 9:
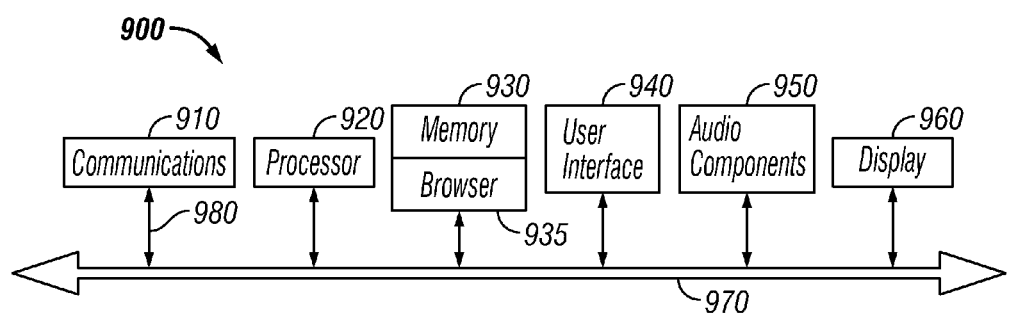
FIG. 9 is a block diagram showing internal components of an exemplary handheld portable electronic device for utilizing one or more exemplary embodiments in accordance with the present invention.

FIGS. 8 and 9 show an exemplary embodiment of a HPCD in accordance with the invention. In one exemplary embodiment, the HPCD is handheld, portable, and multifunctional. As used herein, a "multifunctional" electronic device is capable of performing more than one function, such as, but not limited to, computing functions, cellular transmissions (i.e., functioning as a cellular telephone), playing audio and/or video (example, playing feature length movies), capturing audio and/or video, capturing still images, connecting to and navigating and/or browsing over a network (such as the internet), downloading and/or storing audio and/or video, wirelessly communicating with other electronic devices, etc. Further, plural functions can be simultaneously performed or executed on a multifunctional electronic device (example, a handheld portable electronic device, such as an electronic device having cellular or mobile telephone capabilities).

As shown in FIG. 8, in one exemplary embodiment the HPCD 800 includes a display 820, keypad, 830, speaker 840, microphone 850, and a navigational interface 860. In one exemplary embodiment, the keypad 830 and navigational interface 860 are virtual and appear on a display upon, for example, user touch activation of the display. The HPCD is a wireless device that communicates using, for example, radio frequency (RF) signals, infrared, etc. Audio, video, and/or data communications are transmitted or broadcast from one or more ports or antennas 870 (shown with dashed lines and as being internal to the device).

In one exemplary embodiment, RF signals are transmitted to and from a transceiver that resides in a remote cellular base station. Thus, during a telephone call, RF signals are communicated from the HPCD 810 to a base station antenna and transceiver located on a tower. Users of the HPCD 810 are thus able to communicate voice and video with other parties at remote locations.

FIG. 9 is a block diagram of the HPCD 900. The HPCD includes a communication system 910, processor 920, memory 930, user interface 940, audio components 950, and display 960 coupled together along a bus 970. The processor or processing unit 920 (such as one or more processors or central processing units, CPUs) controls the overall operation of the device 900. The memory 930 (such as random access memory (RAM) for temporary data storage and read only memory (ROM) for permanent data storage) stores data, control programs, one or more browsers 935, applications, programs, feature length movies, songs and music files, and other data associate with the HPCD 900. The processor communicates with the memory and other components via one or more buses 970 and 980.

In one exemplary embodiment, the communication system includes systems for communicating using one or more media, such as infrared, RF, radio waves (example, wireless WLAN/LAN), and other wireless signals (example, various signals for communicating with wireless networks). For instance, the communication system 910 includes a cellular phone communication system interface that facilitates radio frequency (RF) communications to a cellular base station. When a communication is sent from the cellular device to a base station, the communication system 910 or communication interface formats the communication into a format suitable for broadcasting, such as RF signals. Likewise, when a communication is sent to the cellular device from a base station, the communication system 910 or communication interface formats the communication into a format suitable for further processing by other components residing in the cellular device. Communications transmitted to and received at the cellular device include audio data, video data, and other data and information.

The HPCD, though, is not limited to transmitting and receiving RF signals. Other types of signals can also be used to transmit video, audio, and other data. The communication system 910 is configured to receive a variety of signals and convert those signals to an appropriate format for further communication to other devices and displays. The HPCD supports two-way communications with various other electronic devices. Further, the HPCD can simultaneously communicate using multiple different communication signals or media. For instance, the communication system 910 includes interfaces for concurrently communicating with a tower using RF and/or with another electronic device, system, or network using infrared, radio waves (example, wireless WLAN/LAN), and/or wireless transmissions to connect to a network (such as the internet or other private or public networks).

The memory 930 can also include one or more browsers 935 that are software applications used to locate, navigate, and display information (such as web pages) over networks (such as the internet). Graphical browsers display graphics and text and present multimedia information. The multimedia information, for example, includes text, graphics, video, sound, and animation. Further, the memory 930 can include various off-the-shelf software programs, such as those available on a notebook or desktop computer. In this manner, the HPCD is multifunctional and enables users to enter and manipulate data and information (example, using word processing programs or tools).

The user interface 940 is a medium for providing instructions from the user to the processor, browser, etc. For instance, the user can manipulate the keypad 830 and/or navigation interface 860 (see FIG. 8) to interact with the HPCD. Thus, the user interface 940 receives information or commands from the user to control operations of the HPCD.

As shown in FIG. 9, the components 910-960 are communicatively coupled together along the communication bus 970 and connections or buses 980. Embodiments in accordance with the invention, though, are not limited to this type or architecture or connectivity. For example, one or more of the above-described components can be directly coupled to each other or coupled to each other through intermediary components.

Figure 10:
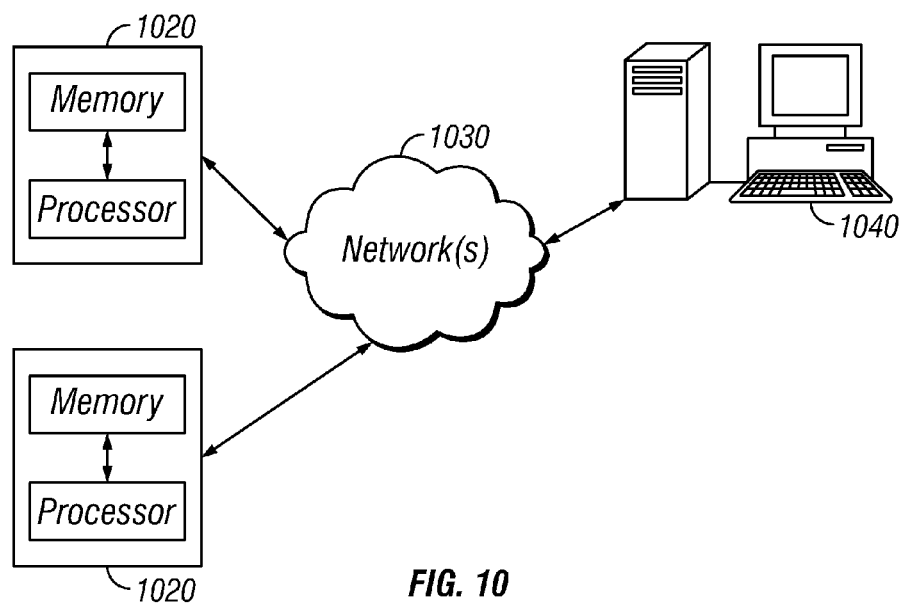
FIG. 10 is an exemplary system for utilizing one or more exemplary embodiments in accordance with the present invention.

FIG. 10 illustrates another exemplary system or data processing network in which an embodiment in accordance with the present invention may be practiced. The data processing network includes a plurality of computing devices 1020 in communication with one or more networks 1030 that is in communication with a computer system and/or server(s) 1040.

By way of example, the data processing network can be an information technology (IT) infrastructure that comprises computer systems, networks, databases, and software applications that are responsible for performing information processing. The IT infrastructure can use computers and software to convert, store, protect, process, transmit, retrieve, monitor, and analyze information and communications.

For convenience of illustration, only a few computing devices 1020 are illustrated. The computing devices include a processor, memory, and bus interconnecting various components. Embodiments in accordance with the present invention are not limited to any particular type of computing device since various portable and non-portable computers and/or electronic devices may be utilized. Exemplary computing devices include, but are not limited to, computers (portable and non-portable), laptops, notebooks, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

The network 1030 is not limited to any particular type of network or networks. The network 1030, for example, can include a local area network (LAN), a wide area network (WAN), and/or the internet or intranet, to name a few examples. Further, the computer system 1040 is not limited to any particular type of computer or computer system. The computer system 1040 may include personal computers, mainframe computers, servers, gateway computers, and application servers, to name a few examples.

Those skilled in the art will appreciate that the computing devices 1020 and computer system 1040 may connect to each other and/or the network 1030 with various configurations. Examples of these configurations include, but are not limited to, wireline connections or wireless connections utilizing various media such as modems, cable connections, telephone lines, DSL, satellite, LAN cards, and cellular modems, just to name a few examples. Further, the connections can employ various protocol known to those skilled in the art, such as the Transmission Control Protocol/Internet Protocol ("TCP/IP") over a number of alternative connection media, such as cellular phone, radio frequency networks, satellite networks, etc. or UDP (User Datagram Protocol) over IP, Frame Relay, ISDN (Integrated Services Digital Network), PSTN (Public Switched Telephone Network), just to name a few examples. Many other types of digital communication networks are also applicable. Such networks include, but are not limited to, a digital telephony network, a digital television network, or a digital cable network, to name a few examples. Further yet, although FIG. 10 shows one exemplary data processing network, embodiments in accordance with the present invention can utilize various computer/network architectures. Various alternatives for connecting servers, computers, and networks will not be described as such alternatives are known in the art.

Figure 11:
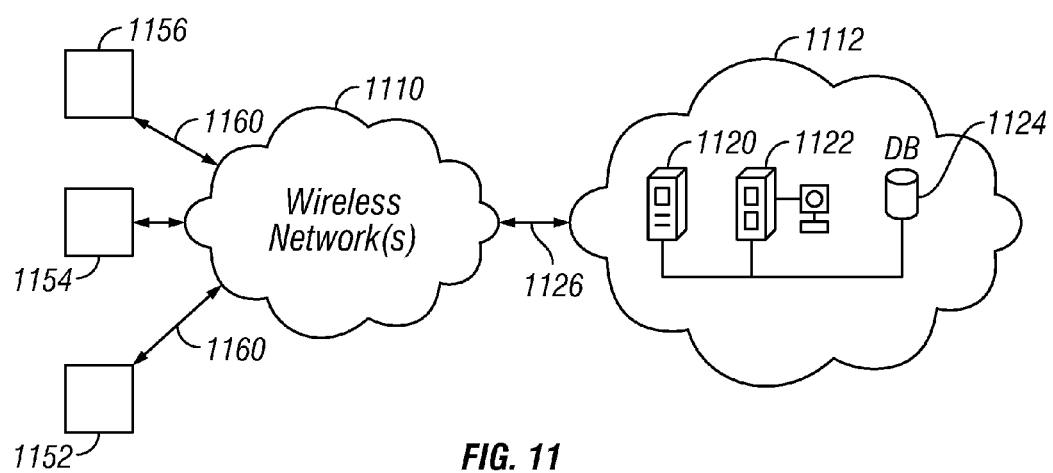
FIG. 11 is another exemplary system showing a networked environment in accordance with an exemplary embodiment of the present invention.

Upon reading this disclosure, one skilled in the art will appreciate that various embodiments exist in accordance with the present invention. FIG. 11 illustrates yet another example of one of many such embodiments as a system 1100. The system may include one or more networks, such as wireless network(s) 1110 and network(s) 1112, each of which includes one or more electronic devices or computers. Those skilled in the art will appreciate, one or more LANs may be included (not shown) with each LAN having one or more computers coupled to a host processor. For example, the networks 1110 and 1112 can have a variety of electronic devices, such as mainframe computers or servers (shown as a gateway computer 1120, an application server 1122, and a database or a data repository 1124). The gateway computer 1120 provides an entry point into each network 1112. The gateway 1120 also couples to network 1110 via communication link 1126. Further, plural wireless electronic devices are shown as an HPCD 1152, a handheld portable electronic device (HPED) 1154, and computer 1156. These devices wirelessly communication via communication lines 1160 to network 1110.

Those skilled in the art will appreciate that the gateway computer 1120 may be located a great geographic distance from the network 1110. Further the electronic devices 1152, 1154, and 1156 can be remote from networks 1110 and 1112. Further, these computers and devices can connect to the networks using a networking protocol such as the Transmission Control Protocol/Internet Protocol ("TCP/IP") over a number of alternative connection media, such as cellular phone, radio frequency networks, satellite networks, etc. The wireless network 1110 can connect to the gateway 1120 using various network connections, such as TCP or UDP (User Datagram Protocol) over IP, Frame Relay, ISDN (Integrated Services Digital Network), PSTN (Public Switched Telephone Network), just to name a few examples.

Thus, embodiments in accordance with the present invention include connections using wireline connections and/or wireless connections. Wireline connections are those that use physical media such as cables and telephone lines. By contrast, wireless connections use media such as satellite links, radio frequency waves, and infrared waves, for example. Many connection techniques can be used with these various media, such as using modems, cable connections, telephone lines, DSL, satellite, LAN cards, and cellular modems, just to name a few examples.

The networks 1110 and 1112 can have various embodiments and still be within embodiments in accordance with the present invention. For instance, such networks include, but are not limited to, one or more of computing networks or other types of digital networks, such as a digital telephony network, a digital television network, or a digital cable network, to name a few examples. Similarly, a gateway or server can be one of any number of different types of computers that have processing and communication capabilities. Various alternatives for connecting servers, computers, and networks will not be described as such alternatives are known in the art.

As mentioned, handheld portable electronic devices (example, cellular devices) include a communication interface to support bi-directional communications with various networks, computers, electronic devices, and other handheld portable electronic devices. Various types of communication interfaces and data formats, now known or later developed, can be used to establish communication between these devices. As example, the handheld portable electronic device can utilize Bluetooth and/or any one of various standards for wireless local area networks (WLAN) based on, for example, IEEE 802.11 or specifications developed in the future. For instance, Wi-Fi enables a user of the handheld portable electronic device to connect to the internet when the device is in proximity of an wireless access point (WAP). The handheld portable electronic device can thus use Wi-Fi to communicate with the remote devices. As another example, various types of cellular telephone networks can be utilized to provide communications between the handheld portable electronic device and the remote device(s). By way of example only, the handheld portable electronic device can utilize global system for mobile communications (GSM), universal mobile telecommunications systems (UMTS), and/or code division multiple access (CDMA) to communicate with the remote devices(s). Thus, by way of example, communications between the handheld portable electronic device and remote devices include, but are not limited to, any one or more of direct cable link, Bluetooth, Wi-Fi, infrared links, cellular networks, short messaging service (SMS), wireless access protocol (WAP), firewire link, serial link, other wired and wireless links, etc.

As used herein, the term "feature length movie" or "feature length film" means a full length motion picture that is greater than sixty minutes in length, but typically between about 90 to 120 minutes or more. A feature length movie is different than a "short" (i.e., a film less than about 30 to 45 minutes), a "trailer" or "movie trailer" (i.e., a preview or publicity film lasting under three minutes that includes scenes or advertisements for an upcoming feature length movie), an advertisement, or a music video. Further, the term "motion picture" or "movie" means a film that has sequential mages that when projected create an illusion of movement. Further yet, embodiments in accordance with the present invention include a wide variety of film media developed in the future or now known, such as photographic film (i.e., film stock), digital video, computer animation, and analog video, to name a few examples.

Further, the term "network space" means social networking websites that provide one or more of uploading of photos, internal email to members, posting of blogs, and posting of member profiles. By way of example, member profiles can include such topics as music, books, videos, film, marital status, physical appearance, religion, income, personal information about the member, and/or personal information about people in whom the member is interested. Further, the term "network location/space" means network location and/or network space.

In one exemplary embodiment, movie distributors, producers, or theaters provide users an incentive to join the sales force and advertise and/or sell feature length movies. In one exemplary embodiment, potential members are provided with free or discounted access to feature length movies if the user becomes a member or purchases a feature length movie. For example, a production company can advertise the following promotion through members: If you buy a feature length film and become a member of the sales team, then you will receive a second feature length movie for free.

In one exemplary embodiment, members of the sales force are provided information regarding upcoming or future feature length movies that are not released. In one exemplary embodiment, members are given information or have access to information about feature length movies that are not yet completed or not yet released to the general public. One skilled in the art appreciates that movie studio and distributors often announce actual or estimated release dates or time periods for feature length movies. For example, a studio may announce that a new feature length movie is a "coming attraction" or "coming this fall" or "coming this summer" or, "coming to a theater near you" etc. New feature length movies can also be given definitive or exact release dates in the future.

Information concerning upcoming feature length movies can be provided to members or their HPEDs or computing devices in a variety of ways using a variety of media. Members can be sent advertisements or announcements about to-be-released feature lengths movies. In one exemplary embodiment, movie trailers, advertisements, or notices are sent to members. For example, a cellular telephone company or network space company can send its subscribers or members information (example, text messages, hyperlinks, or emails) providing a list of upcoming feature length movies and their corresponding release dates. This information, for example, can be sent directly to HPEDs or computing devices of the subscribers of the cellular telephone company or members of a particular network space. For instance, users can view of list of upcoming feature length movies and be asked if they want to pre-order or purchase one or more feature length movie tickets in advance of the movie being available for viewing to the general public.

Some movie goers place significant value on viewing feature length movies before the movies are available to everyone. In other words, some movie viewers will pay extra to watch a feature length movie before the movie is available to the general public. In one exemplary embodiment, users who belong to a specific group (example, members of the sales force, members of a particular network location/space, or subscribers to a cellular service provider) can download or access (example, via a hyperlink, email, text message, etc.) a feature length movie on the HPED or computing device on or before the release date. In other words, some users can view the movie before it is available to the general public on or before the release date if the user is willing to perform a specified act or pay a fee.

Added incentives or promotions can also be provided to users who download movies. In other words, in some exemplary embodiments, it is more cost effective if users download movies or access movies via a link or broadcast, as opposed to renting or purchasing hardcopies on DVD or tape. For instance, users are given a discount on purchasing a feature length film if the users purchase as a download, hyperlink or broadcast feature length movies on or before the release date if, as oppose to receiving a hardcopy of the movie.

In one exemplary, a movie studio, producer, or movie distributor partners or contracts with a network space company so members of the network space can view a particular feature length movie before the release date. For instance, assume that movie studio A produces a feature length movie B that is not yet released to the public. Movie studio A and network space company C decide that members of network space company C have an option to view this feature length movie B on or before the movie released date (i.e., date the movie is first made available to the general public, for example, in movie theaters and/or DVDs). These members are given information (example, text message, email, or announcement to their HPED) about upcoming feature length movie B. These members form a selective group since non-members or others in the general public would be denied an opportunity to view the feature length movie B one or before its release date. Thus, viewing the feature length movie B on or before its release date is tied to the sale of another product or service (i.e., tied to the sale of a membership for network company C, tied to purchasing another FLM, tied to becoming a member of the sales team for advertising and selling FLMs, or tied to selling a predetermined number of FLMs for the movie studio A). Further, in order to view the feature length movie B on or before the release date, such member can be required to perform a certain action, such as, but not limited to: (1) receive the movie in a particular format (example, download the movie to their HPED or receive the movie in a non-hardcopy format), (2) watch the movie only on a HPED (i.e., the movie is limited to viewers having an HPED and not available to viewers on a television or theatre or DVD), (3) become a member or subscriber to a particular organization, store, theater, or company service, (4) be physically present at a particular location on a particular day or during a particular time period, and (5) pay a fee for the right to view the movie on or before the release date.

In some exemplary embodiments, users are able to view a feature length movie on their HPED or computing device on or before its public release date. As used herein, the term "public release" means the first distribution to the general public for viewing the feature length movie. Typically, the first distribution to the general public occurs in movie theaters, on DVDs, or simultaneously in movie theaters and on DVDs. The term "public release date" or "release date" means the calendar date or day on which the public release occurs.

In one exemplary embodiment, a user pre-orders, pre-purchases, or buys the feature length movie before its release date in order to ensure that the user receives the feature length movie on or before the actual release date. As noted, some users are eligible to view the feature length movie on or before the release date since such users perform a certain action (examples previously provided). By way of example, a user accesses the internet or network using a HPED and navigates to a network location/space. Here, the user orders a feature length movie that has not yet been released. The user is not sent the movie on the date at this time (i.e., the order date) since the order date occurs before the release date. At this time, the feature length movie may not even be completed (i.e., ready for distribution) or may be completed but not yet released on DVD, released in theaters and/or otherwise available to the general public. Instead, the movie is broadcast, sent, made available, or transmitted to the user in the future on or before the actual release date. By pre-ordering the movie, the user is ensured, authorized, or guaranteed to receive or view the feature length movie on or before the release date since it was ordered on or before the release date. As noted above, the right to access or view the feature length movie on or before the release date can be tied to or contingent on the user becoming a member of a sales force to sell the FLM.

In one exemplary embodiment, the feature length movie is sent, transmitted, made available, broadcast, or delivered to a specified computer or the HPED on or before the release date for the feature length movie. In one exemplary embodiment, the feature length movie is wirelessly transmitted or wirelessly sent to the HPED of the user. For instance, at the time the feature length movie is ordered, the user can specify or designate one or more computers, email addresses, HPEDs (example, by providing a cellular telephone number), and/or handheld portable electronic devices for receiving the feature length movie on, after, or before its release date. Embodiments in accordance with the present invention, though, are not limited to transmitting the feature length movie on, after, or before its release date to a HPED or computing device. For example, a user can specify information (example, network address, email address, web site, phone number, etc) to indicate a specific location, server, HPED, or computer for receiving the feature length movie before its release date. For example, a user can navigate to a retail store website or theater website using a notebook computer, pre-order the feature length movie, and specify that the movie be transmitted to a designated HPED on, after, or before the release date. As another example, a user can navigate to a website using a cellular phone, buy the feature length movie before its release date, and specify an email address or network location where the movie is sent before its release date. Once the feature length movie is available, the user could then access the email account or network location with a computer or handheld portable electronic device to retrieve (example, via an email or hyperlink) the feature length movie.

As yet another example, users or production companies can designate a time for receiving the feature length movie on, after, or before the release date. For instance, a user may select a specific time of day, example 7:00 p.m. to receive the feature length movie. At 7:00 p.m. before the release date, the feature length movie is broadcast to the HPED or computing device of the user. The user can thus designate a specific time to watch the movie on, after, or before the release date. Further, the feature length movie may or may not be downloaded to the HPED. The user can be sent (example, via broadcasting or multicasting) a message or notice before the designated time as a reminder that the feature length movie will begin to play at the designated time. At this designated time, the feature length movie can be automatically sent or broadcast to the HPED.

In one exemplary embodiment, the feature length movie is automatically and wirelessly transmitted to the HPED or computing device on, after, or before the release date. As an example, the user uses a HPED to access the network location and select and pre-order a feature length movie before its release date. Later, before the release date, the selected movie is automatically transmitted or downloaded to the same HPED used to select and pre-order the feature length movie.

Once the feature length movie is available for viewing or the rental or purchase complete, the user is notified. For instance, a notice can be sent to the user's email account, computer, handheld portable electronic device, etc. Users can be notified in a wide variety of ways. By way of further example, a message or notification is sent to a display of a HPED reminding or informing the user that the feature length movie is ready for viewing or downloading. As another example, an automatic voice message, email, or text message is sent to a HPED or computer, or email account to notify the user.

Users can navigate or select menu options using a variety of techniques, such as, but not limited to, clicking, highlighting, etc. In one exemplary embodiment, a user uses voice commands or drilldown techniques to further generate and select menu options (example, using the user interface 940 of FIG. 9).

Retail stores, cellular phone companies, internet service providers, network space companies, production companies, distribution companies, or movie theaters can offer memberships to certain people or groups of people (example, all individuals, people belonging to a certain organization, people registered with a specific cellular phone service provider, members of a particular movie theater, etc.). Members are granted certain rights or privileges, such as the right to rent, purchase, or view feature length movies on, before, or after the release date, the right to receive special promotions or discounts, the right to receive information about upcoming new FLM releases, etc. Nonmembers can be denied such rights or denied the opportunity, for example, to download or watch feature length movies to their HPEDs in consideration for becoming a member and advertising and selling FLMs.

In one exemplary embodiment, users are provided with quick and easy access to authorization or to membership. Users are not required to perform numerous steps in order to become members, such as fill-out a form, provide address information, provide credit card information, stand in line, etc. Instead, users are provided with a single click membership option. In other words, users are able to minimally interact with their HPED to request and receive instant membership. For instance, information from other memberships or other organizations is used to register the user or otherwise provide the necessary membership information to the production company or distribution company.

As one example, some users have subscriptions for their HPCD with a cellular telephone company or cellular service provider. The cellular telephone company and production company have an agreement wherein subscribers to the cellular telephone company can also become temporary or limited members of the production company to advertise and sell movies of the production company. The two companies agree to share information about subscribers or members. In order to have a subscription with the cellular telephone company, users were previously required to enter personal information, billing information, etc. This same information or portions of this information are used to establish a membership with the production company. For instance, the display of the HPCD has a link or icon ("Single Click Membership with Production Company"). If the user of the HPCD "clicks" or activates this link, then membership to the production company automatically occurs without the user being required to enter personal information, billing information, etc. This information was previously provided to the cellular telephone company and is provided to or shared with the production company to enable instant or real-time information to the production company to determine if the user qualifies for membership to the production company.

If the user is not also a member of another organization with the appropriate information for membership to the production company, then the user can enter such information through interaction with the display of the HPCD. For example, the HPCD can show a link or icon ("Network Registration") to enable users to enter the appropriate membership information. In one exemplary embodiment, the HPCD prompts users through a series of questions to gather the appropriate information for membership to the production company using the HPCD.

The user can pay for the selected movie in a variety of ways, such as through deduction to credit card or bank account, subsequent billing to the user, subsequent billing to the user through a cellular phone subscription, etc. In one exemplary embodiment, an electronic receipt is automatically transmitted to the HPCD upon purchasing a movie ticket for a feature length movie.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer system, comprising:
    displaying, by the computer system and at an internet location, an advertisement to purchase a feature length movie (FLM) before the FLM is publicly available to view in movie theaters and before the FLM is publicly available to buy on digital video disks (DVDs);
    displaying, by the computer system and at the internet location, a movie trailer for the FLM;
    selling, by the computer system and at the internet location, the FLM to individuals that purchase the FLM with handheld portable electronic devices (HPEDs) before the FLM is publicly available to view in the movie theaters and before the FLM is publicly available to buy on the DVDs; and wirelessly transmitting and downloading, before the FLM is publicly available to view in the movie theaters and before the FLM is publicly available to buy on the DVDs, the FLM to the HPEDs of the individuals that purchased the FLM, wherein the FLM is downloaded to the HPEDs such that the FLM plays on the HPEDs at times decided by the individuals viewing the FLM with the times being before the FLM is publicly available to view in the movie theaters and before the FLM is publicly available to buy on the DVDs, wherein the FLM is subsequently distributed to the movie theaters for viewing by a general public after the FLM plays on the HPEDs of the individuals, and wherein the FLM is full length motion picture that is greater than sixty minutes in length.

2. The method executed by the computer system of claim 1, wherein the internet location is a retail store that sells the FLM to members of the retail store, and the members of the retail store are granted a right to view the FLM before the FLM is publicly available to view in the movie theaters and before the FLM is publicly available to buy on the DVDs.

3. The method executed by the computer system of claim 1, wherein the internet location is a social networking website of an actor in the FLM.

4. The method executed by the computer system of claim 1 further comprising:

wirelessly transmitting the FLM to the HPEDs of the individuals that purchased the FLM at times designated by the individuals.

5. The method executed by the computer system of claim 1 further comprising:

marketing the FLM by offering individuals that purchased the FLM an opportunity to advertise and to sell the FLM at social networking websites of the individuals that purchased the FLM.

6. The method executed by the computer system of claim 1 further comprising:

marketing the FLM by placing movie trailers for the FLM and hyperlinks to purchase the FLM at social networking websites of individuals of the general public not affiliated with the FLM;

compensating the individuals when visitors to the social networking websites view the movie trailer of the FLM;

compensating the individuals when the visitors to the social networking websites purchase the FLM.

7. The method executed by the computer system of claim 1, wherein the internet location is a social networking website, a company of the social networking website contracts with a movie distributor of the FLM such that members of the social networking website can purchase and view the FLM before the FLM is publicly available to view in the movie theaters and before the FLM is publicly available to buy on the DVDs, and non-members of the social networking website are denied an opportunity to purchase and view the FLM before the FLM is publicly available to view in the movie theaters and before the FLM is publicly available to buy on the DVDs.

8. The method executed by the computer system of claim 1 further comprising, increasing a number of new salespeople who sell the FLM over network spaces belonging to the new salespeople by compensating existing salespeople for causing a public individual to become a new salesperson.

* * * * *